(12) United States Patent
Muramatsu

(10) Patent No.: US 7,860,756 B2
(45) Date of Patent: Dec. 28, 2010

(54) OPTICAL DISC APPARATUS

(75) Inventor: Keiichi Muramatsu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 338 days.

(21) Appl. No.: 12/071,767

(22) Filed: Feb. 26, 2008

(65) Prior Publication Data

US 2008/0208706 A1 Aug. 28, 2008

(30) Foreign Application Priority Data

Feb. 27, 2007 (JP) ............................ 2007-047750

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS

| | | | |
|---|---|---|---|
| 6,438,232 | B1 | 8/2002 | Mages et al. |
| 7,233,948 | B1 * | 6/2007 | Shamoon et al. |
| 2002/0156705 | A1 | 10/2002 | Koyata et al. |
| 2004/0013416 | A1 | 1/2004 | Mok |
| 2005/0270423 | A1 | 12/2005 | Matsunaga |
| 2006/0117158 | A1 | 6/2006 | Shionoya et al. |

FOREIGN PATENT DOCUMENTS

| | | |
|---|---|---|
| EP | 1 251 514 | 10/2002 |
| JP | 2003-084985 | 3/2003 |
| JP | 2004-078728 | 3/2004 |
| JP | 2006-085349 | 3/2006 |
| WO | WO-02/15024 | 2/2002 |
| WO | WO-02/21266 | 3/2002 |
| WO | WO 03/085967 | 10/2003 |

OTHER PUBLICATIONS

PR Newswire, DVD-R/RW Computer Drives and DVD Recorders Require Firmware Update for New High Speed Discs, New York: Sep 17, 2002, downloaded from ProQuest Direct on the Internet on Mar. 28, 2010, 3 pages.*
PR Newswire, DVD-R/RW Computer Drives and DVD Recorders Require Firmware Update for New High Speed Discs, New York: Sep 17, 2002, downloaded from ProQuest Direct on the Internet on Aug. 24, 2010, 3 pages.*

* cited by examiner

*Primary Examiner*—James Zurita
(74) *Attorney, Agent, or Firm*—Morgan Lewis & Bockius LLP

(57) ABSTRACT

When device information is transmitted from a DVD recorder to a server, the server transmits selectable function information that is selectable in the DVD recorder side to the DVD recorder. If a reproducing function for MP3, for example, is selected from the selectable function information, the DVD recorder transmits information of reproducing function for MP3 to the server. The server transmits amount billed for the reproducing function for MP3 and the like to the DVD recorder. A user makes the DVD recorder transmit a password when the user approves the amount billed. If the server judges that the password is correct, the server transmits a firmware related to the reproducing function for MP3 to the DVD recorder, then the DVD recorder rewrites an existing firmware that is stored in a flash memory to a firmware on which the firmware related to reproducing function for MP3 is added.

4 Claims, 6 Drawing Sheets

OPTICAL DISC APPARATUS

This application is based on Japanese Patent Application No. 2007-047750 filed on Feb. 27, 2007, and the contents of which are hereby incorporated by reference.

BACKGROUND OF THE INVENTION

1. Field of the Invention

The present invention relates to an optical disc apparatus which has a structure in that the device can be connected to a server through the Internet and which is capable of adding an optional function.

2. Description of the Related Art

Recently, a digital versatile disc (DVD) which is an optical disc that can record a large capacity of information of audio and video data such as a movie and the like, has become popular. As for kind of DVD, it is well known that a DVD-ROM on which information is recorded by a manufacturer and information cannot be overwritten by a user, a DVD-R or a DVD+R on which information can be written once by a user, a DVD-RW, a DVD+RW or a DVD-RAM on which information can be overwritten by user some times and the like. The information recorded on these DVDs can be reproduced by a DVD player or a DVD recorder and recording on a DVD-R, a DVD+R, a DVD-RW, a DVD+RW, or a DVD-RAM can be performed by the DVD recorder.

By the way, for an optical disc apparatus such as the DVD recorder or the DVD player, production and sales are performed such that number of models of the optical disc apparatus is made large and amount of production for each model is kept small in order to be applicable to various users. That is, in the optical disc apparatus production and sales are performed in so called "many models and small production" in preparation for a variety of users.

For example, such as a DVD recorder which has a recording/reproducing function of DVD-R and a recording/reproducing function of DVD-RW, a DVD recorder which has a recording/reproducing function of DVD+R and a recording/reproducing function of DVD+RW, a DVD player which has the reproducing function of DVD-R and the reproducing function of DVD-RW, and a DVD player which has the reproducing function of DVD+R and the reproducing function of DVD+RW, many models and small production policy is kept in production and sales in the optical disc apparatus.

At this point there are cases that users require to add a new function onto the optical disc apparatus they have purchased. However, in such cases, because the conventional optical disc apparatus does not have a structure by which the new function is added on, the user must buy a new optical disc apparatus which has the function the user requires to add. It causes a problem that burden of buying expense for the user becomes increased. Further for manufacturer, because the manufacturer makes number of models of the optical disc apparatus large and keeps amount of production of each model small to correspond to various users, it causes a problem that production cost of the optical disc apparatus becomes high.

In the conventional technology disclosed in JP-A-2006-085349, a salesperson in an outlet store, for example, connects a camera which is required by a user to a sales management apparatus and downloads a latest firmware from the sales management apparatus to the camera for installing the firmware. However, this conventional technology does not disclose anything about process and structure for a case that it is required to add a new function for the optical disc apparatus which is bought by a user, therefore, it cannot solve the problem as above described.

In the conventional technology disclosed in JP-A-2004-078728, a television receiver is supplied with download service of a module. However, this conventional technology does not also disclose anything about process and structure for a case that it is required to add a new function for the optical disc apparatus which is bought by a user, therefore, it cannot solve the problem as above described, too.

In the conventional technology disclosed in JP-A1-2002-021266, an application is downloaded to a wireless portable terminal in response to a requirement through the Internet. However, this conventional technology does not also disclose anything about process and structure for a case that it is required to add a new function for the optical disc apparatus which is bought by a user, therefore, it cannot solve the problem as above described, too.

In the conventional technology disclosed in JP-A-2003-084985, a Set Top Box user pays for delivered machine and downloaded software to a cable operator for installing a latest software when the machine is purchased. However, this conventional technology does not also disclose anything about process and structure for a case that it is required to add a new function for the optical disc apparatus which is bought by a user, therefore, it cannot solve the problem as above described, too.

SUMMARY OF THE INVENTION

It is an object of the present invention to provide an optical disc apparatus whose an optional function is selectable by a user, and which can select an optional function required by the user, and which can add the optional function.

To attain the above described object an optical disc apparatus in accordance with the present invention is structured to have: a structure which can connect with a server through the Internet; and a system controller that includes: a device information transmitting portion which transmits a device information to identify the apparatus to the server when the apparatus connects with the server through the Internet and obtains a firmware in that a function required by a user is contained from the server; a function information receiving portion which receives function information that is transmitted from the server in response to the device information received by the server and that is selectable in the apparatus side; a selected function information transmitting portion which transmits information of a selected function that is selected by the user from the selectable function to the server; a billing information receiving portion which receives billing information that contains amount billed and a password request transmitted from the server in response to the selected function information which is received by the server; a password transmitting portion which transmits a password to the server when the amount billed that is contained in the billing information is approved, the password is input by the user, and a transmission direction is performed to transmit the password to the server; a firmware receiving portion which receives a firmware that is transmitted from the server after the password received by the server is judged to be correct; and a firmware storage processing portion which rewrites an existing firmware that is stored in a flash memory to a firmware on which the received firmware is added after reception of the firmware is completed.

By such structure, because the optional function is selectable in users side, and it becomes possible to select an optional function which is required by the user and to add the optional function to the firmware, the user can get the function only for additional cost for the required optional function and need not to newly purchase an optical disc apparatus in which the required function is contained, as a result economic burden for the user to obtain the function can be reduced. Further for the manufacturer, because the optical function can be added later in response to the user's requirement, an optical disc apparatus which contains only a simple function and which gets wide range of target purchaser, can be manufactured in mass production, and it becomes no need to perform production for many numbers of models of the optical disc apparatus, as a result, cost reduction of the optical disc apparatus can be realized.

Further, the optical disc apparatus in accordance with the present invention has a structure in that the system controller further includes a selectable function list display processing portion which makes a display device display a list of the selectable function when the function information receiving portion receives the selectable function information in the optical disc apparatus that is structured as above described.

By such structure the user can understand the selectable function at a glance to select the required function easily.

Further, the optical disc apparatus in accordance with the present invention has a structure in that the system controller further includes a billing information display processing portion which makes a display device display the billing information that contains the amount billed and the password request when the billing information receiving portion receives the billing information in the optical disc apparatus that is structured as above described.

By such structure the user can know the amount billed and the password request at a glance.

DESCRIPTION OF THE PREFERRED EMBODIMENTS

Figure 1:
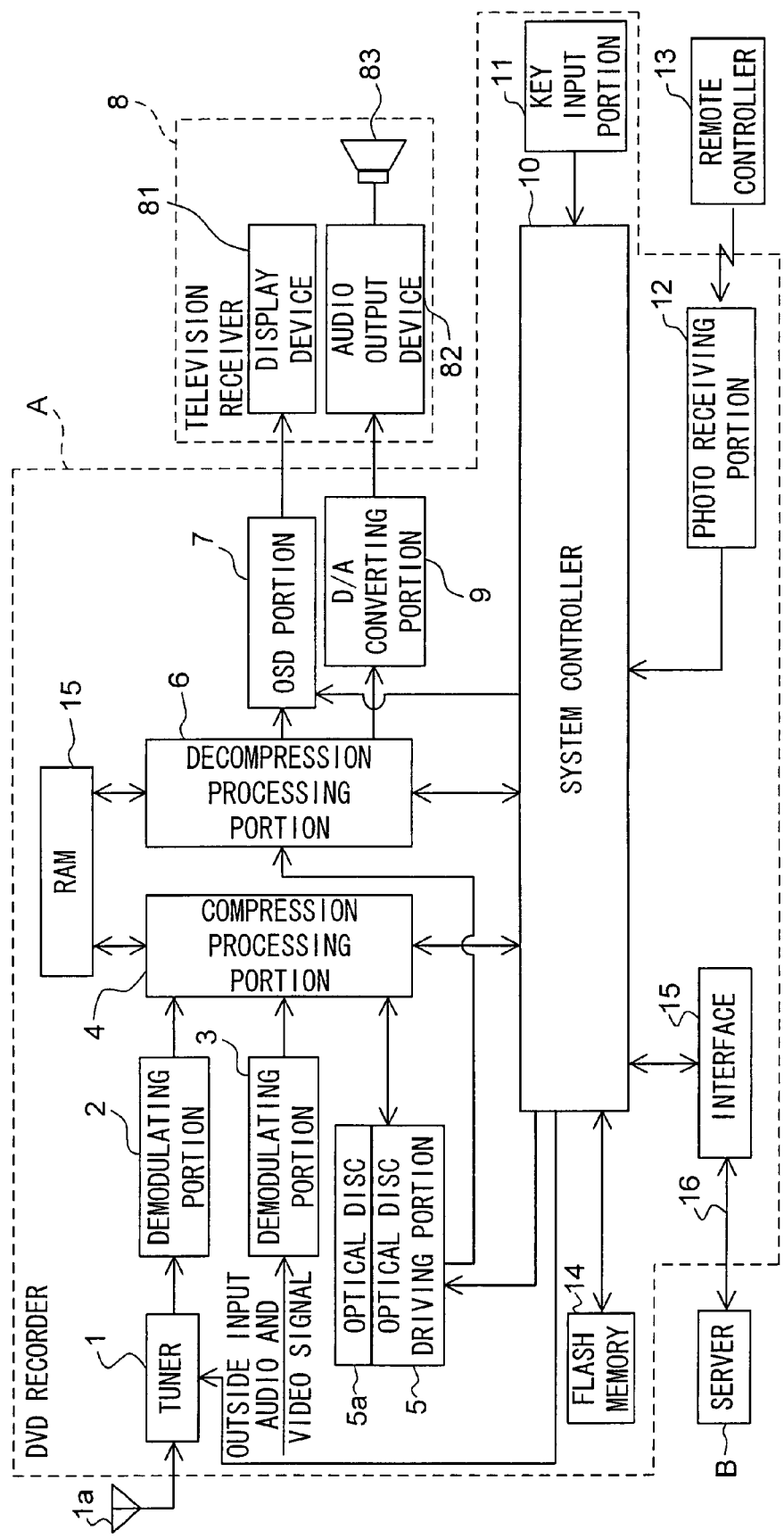
FIG. 1 is a block diagram to show a structure of a DVD recorder as an optical disc apparatus according to an embodiment of the present invention.

Hereinafter an embodiment of the present invention will be explained with reference to accompanied drawings. FIG. 1 is a block diagram to show a structure of a DVD recorder as an optical disc apparatus according to one embodiment of the present invention. In this embodiment a DVD recorder will be explained as the optical disc apparatus, however even in a DVD player a reproducing function can be added as in a case for the DVD recorder by adding a firmware for a reproducing function such as a reproducing function for MPEG-1 Audio Layer 3 (MP3), for example.

This DVD recorder A is equipped with a tuner 1 which receives a television broadcast signal through an antenna 1a and tunes a television broadcast signal that is sent from a desired broadcasting station, a demodulating portion 2 which demodulates audio and video signal from the tuner 1, a demodulating portion 3 which demodulates audio and video signal input from outside, a compression processing portion 4 which performs compression process with MPEG standard for the audio and video signal that is demodulated by the demodulating portion 2 or the demodulating portion 3, a disc driving portion 5 which writes the compression processed audio and video data in an optical disc 5a or reads audio and video data from an optical disc 5a, and a decompression processing portion 6 which performs decompression process for the audio and video data that is read out by the disc driving portion 5 to reconstruct original audio and video data.

Further, the DVD recorder A is also equipped with an on-screen display (OSD) portion 7 which converts video data (when there is massage data from a system controller 10, the message data is overlaid on the video data) out of the audio and video data that is reconstructed to video signal possible to be displayed to supply to a display device 81 of a television receiver 8, a digital-analog (D/A) converting portion 9 which converts audio data out of the audio and video data that is reconstructed by the decompression processing portion 6 from digital signal to analog signal to supply the audio signal to an audio output device 82 which is connected to a speaker 83 of the television receiver 8, a random access memory (RAM) 15 which stores temporarily the audio and video data when the compression process by the compression processing portion 4 or the decompression process by the decompression processing portion 6 is performed, the system controller 10 which controls operations of the whole apparatus, a key input portion in a main body 11 by which various key operating signals are input to the system controller 10, a photo receiving portion 12 which receives various infrared key operating signal from a remote controller 13 and converts to various electric key operating signal to output to the system controller 10, a flash memory 14 in which programs and data that are necessary for processes by the system controller 10 are stored, and an interface 15 which performs bidirectional communications with a server B that supplies a firmware which is required by a user through Internet 16 such as a telephone line.

Figure 6:
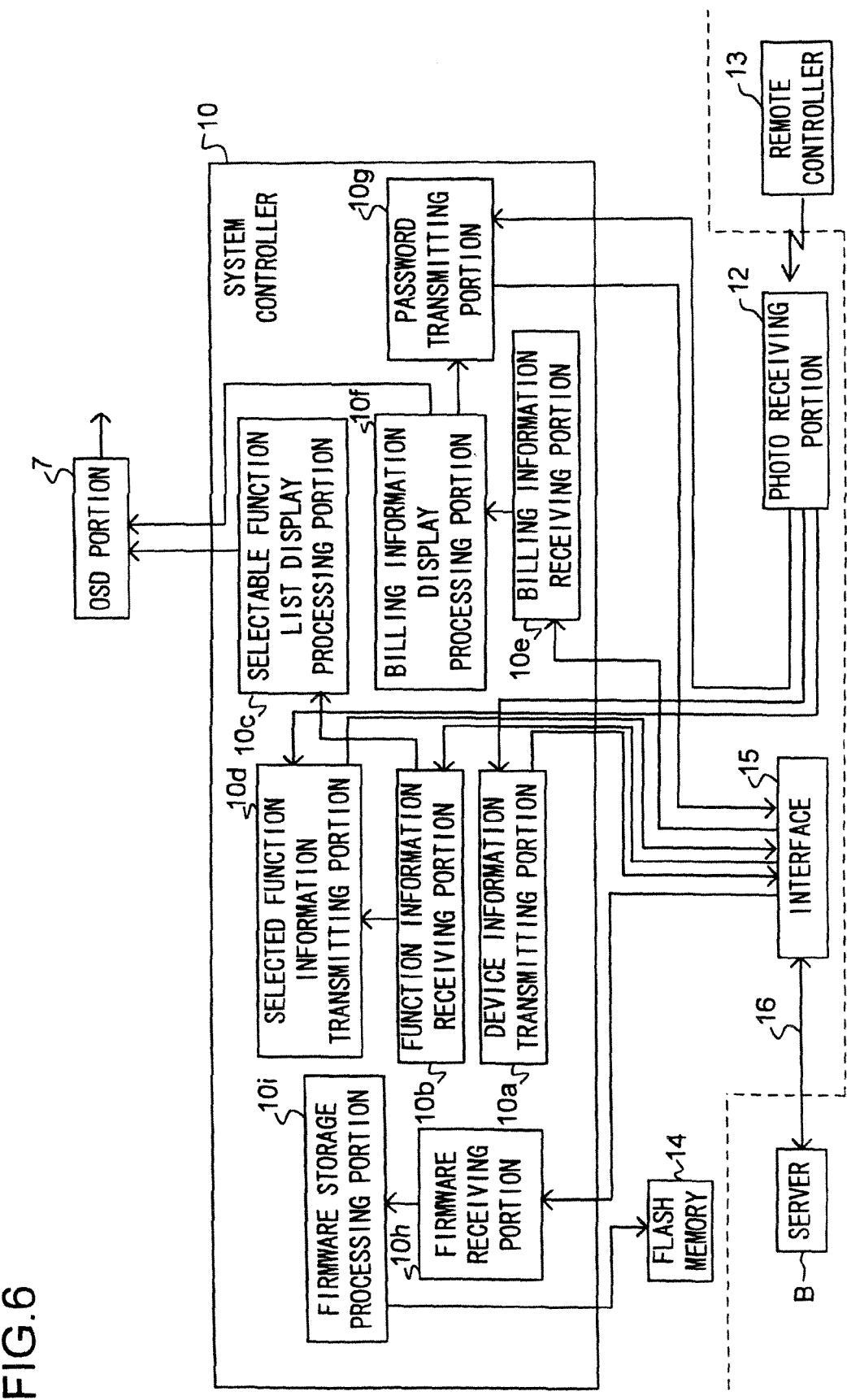
FIG. 6 is a block diagram to show a structure of the system controller of FIG. 1 according to an embodiment of the present invention.

As shown in FIG. 6, the system controller 10 includes a device information transmitting portion 10a which transmits a device information to identify the DVD recorder A to the server B when the DVD recorder A is connected with the server B through the Internet 16 to obtain from the server B a firmware in which a function required by a user is contained, a function information receiving portion 10b which receives function information that is selectable in the DVD recorder A side that is transmitted from the server B in response to the device information which is received in the server B, a selectable function list display processing portion 10c which makes the display device 81 display a list of the selectable function when the selectable function information is received, a selected function information transmitting portion 10d which transmits function information that is selected by the user from the selectable function that is displayed in the list to the server B, a billing information receiving portion 10e which receives billing information containing amount billed and password request that are transmitted from the server B in response to the selected function information which is received by the server B, a billing information display processing portion 10f which makes the display device 81 display the billing information, a password transmitting portion 10g which transmits a password to the server B when the amount billed contained in the billing information is approved, the password is input by the user, and a transmission direction to transmit the password to the server B is performed, a firmware receiving portion 10h which receives the firmware that is transmitted from the server B after the password which is received by the server B is judged to be correct, and a firmware storage processing portion 10i which rewrites an existing firmware that is stored in the flash memory 14 to a new firmware on which the received firmware is added after reception of the firmware is completed.

Figure 2:
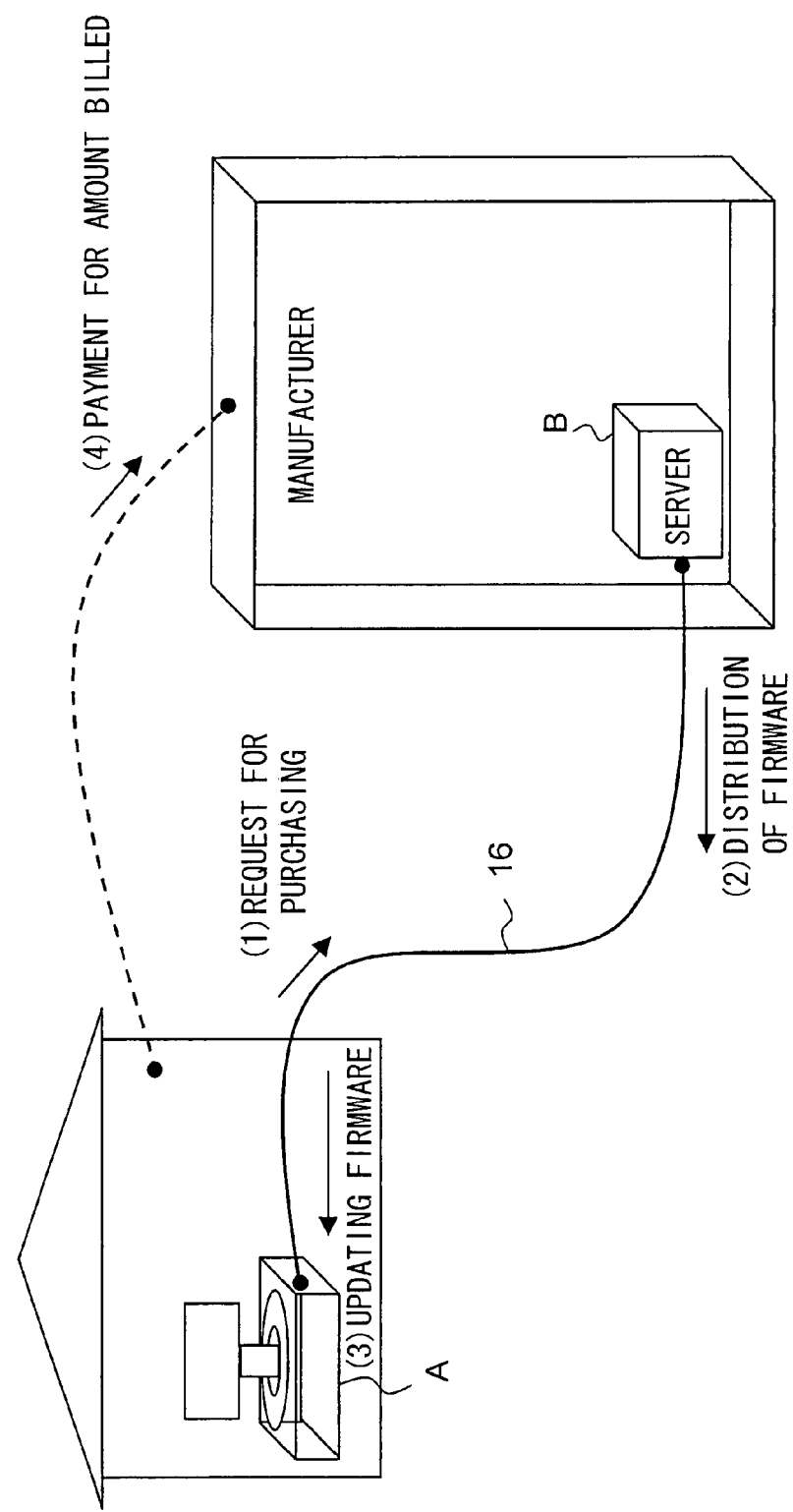
FIG. 2 is a structural diagram to show a state where a DVD recorder is connected to a server through the Internet in an embodiment of the present invention.

FIG. 2 is a structural diagram to show a state where the DVD recorder is connected to the server through the Internet in the embodiment of the present invention. As shown in FIG. 2, the DVD recorder A is connected to the server B of a manufacturer through the Internet 16 such as a telephone line. A user performs a request for purchasing a firmware that contains a required function by the user to the manufacturer (step 1), and in response to the demand, the manufacturer performs distribution of the firmware containing the function to the DVD recorder A of the user utilizing the server B (step 2). In the DVD recorder A, the existing firmware stored in the flash memory 14 is updated by rewriting to the new firmware on which the required function is contained (step 3). Then, the user performs payment of the amount billed for a cost of purchasing the firmware containing the required function to the manufacturer (step 4).

Figure 3:
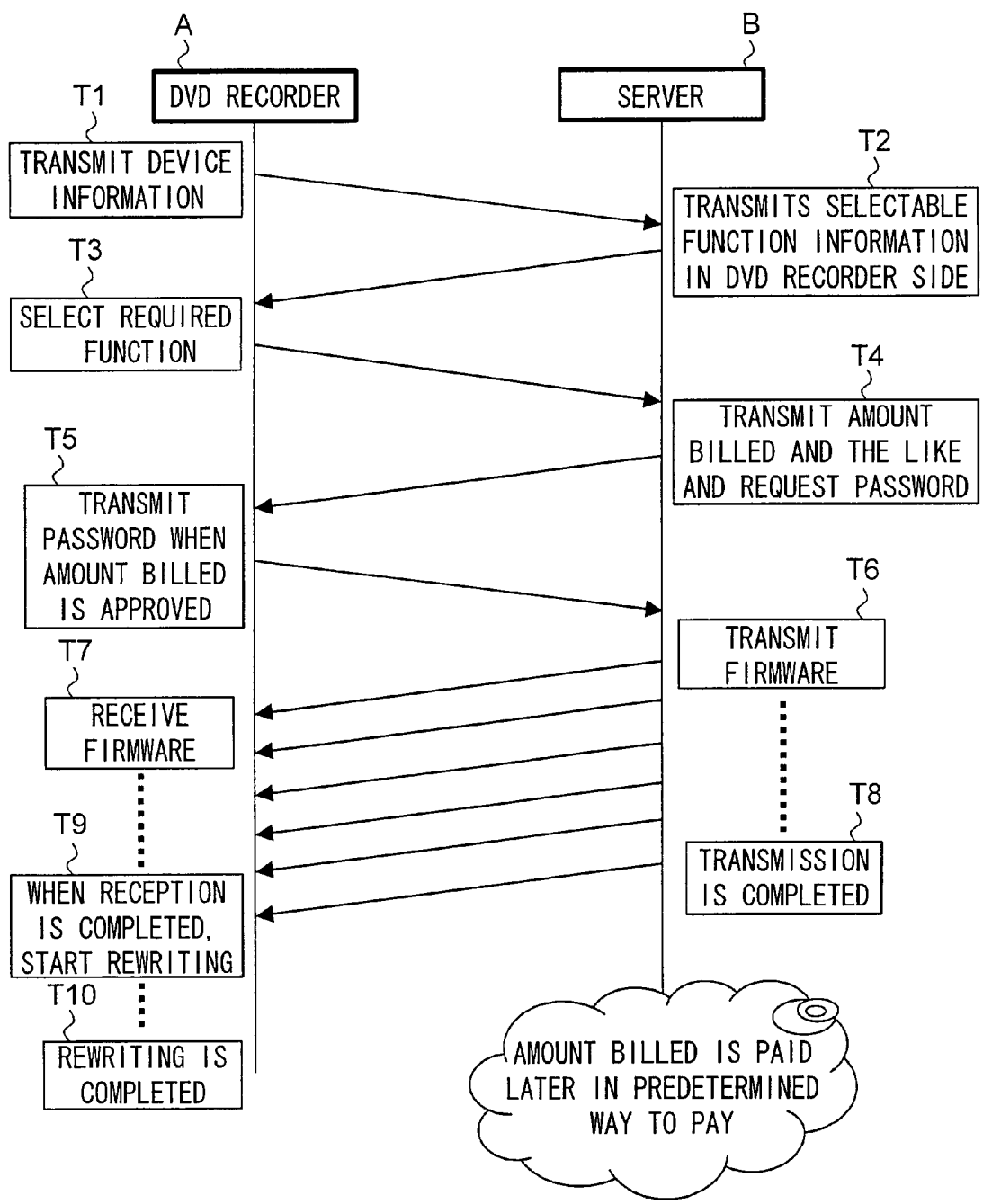
FIG. 3 is a flow diagram to explain a flow of information which are transmitted and received between a DVD recorder and a server when a firmware that contains a function required by a user, is obtained from the server to the DVD recorder in an embodiment of the present invention.
Figure 4:
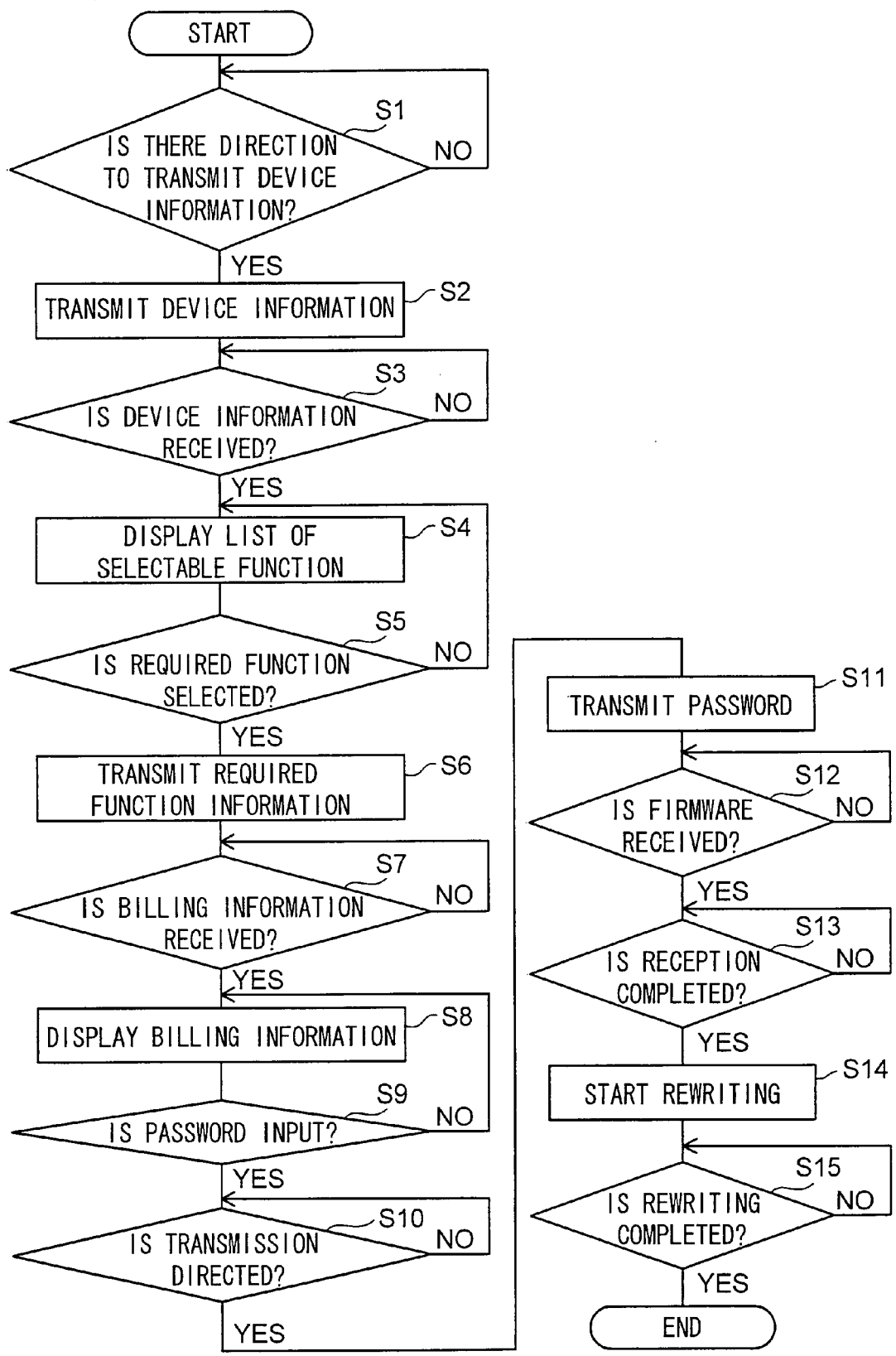
FIG. 4 is a flowchart to explain a process when a firmware that contains a function required by a user, is obtained from a server to a DVD recorder in an embodiment of the present invention.
Figure 5:
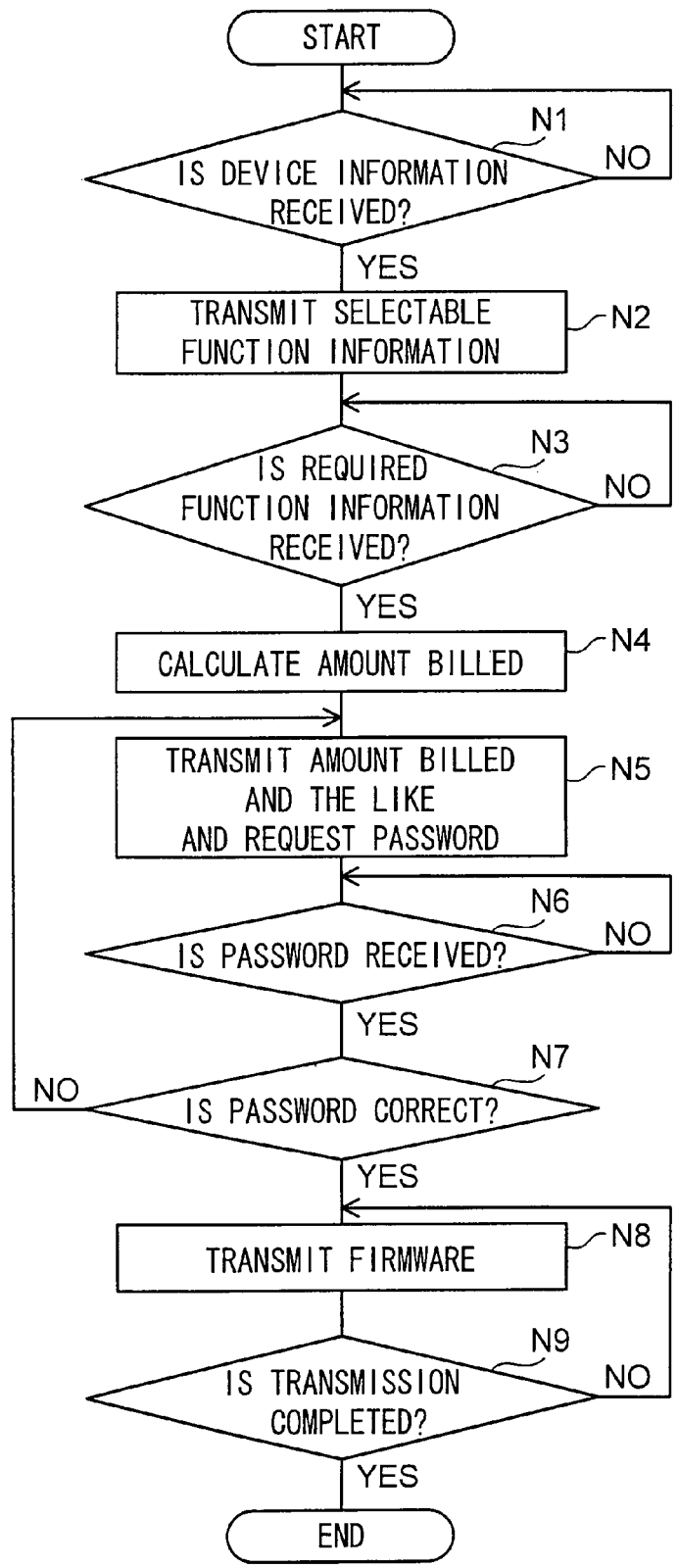
FIG. 5 is a flowchart to explain a process in a server side when a firmware that contains a function required by a user, is required to a server by a DVD recorder in an embodiment of the present invention.

FIG. 3 is a flow diagram to explain a flow of information which are transmitted and received between the DVD recorder and the server when the firmware that contains the function required by the user is obtained from the server to the DVD recorder in the embodiment of the present invention. FIG. 4 is a flowchart to explain a process when the firmware that contains the function required by the user is obtained from the server to the DVD recorder in the embodiment of the present invention. FIG. 5 is a flowchart to explain a process of the server when the firmware that contains the function required by the user is requested to the server by the DVD recorder in an embodiment of the present invention.

Hereinafter process when the firmware that contains the function required by the user is obtained by the DVD recorder from the server will be explained with reference to FIG. 1 to FIG. 5. In this embodiment, a reproducing function of MP3 is explained by way of example as the function required by the user. However, as for the function required by the user, it is not limited to the reproducing function of MP3, there are various functions, mainly functions which licensing fee is caused such as a recording function (video recording function) of DVD+R, a reproducing function of Windows Media, and the like. As a result, firmwares which contain various functions are stored in the server B, mainly the functions which cause a licensing fee such as the reproducing function of MP3, the recording function of DVD+R, the reproducing function of Windows Media, and the like.

By the way, it is assumed that a user purchases a DVD recorder A which includes only a simple function. It is also assumed that this DVD recorder A does not contain the reproducing function of MP3, for example. So the user performs an operation for the DVD recorder A to obtain the firmware that contains the reproducing function of MP3 which is required by the user from the server B in order to add the reproducing function of MP3 to the DVD recorder A.

First, the user operates the remote controller 13 to transmit infrared signal for directing transmission of device information, and the infrared signal is received by the photo receiving portion 12. The received signal is converted to device information transmission directing signal in electric signal, and the device information transmission directing signal is input to the system controller 10. By this input, the device information transmitting portion of the system controller 10 detects a device information transmission requesting direction (step S1), reads out the device information (serial number, model type, date of manufacture, kind of functions loaded, name of county to be manufactured, name of country to be sold, and the like) for identifying the DVD recorder A from the flash memory 14, and transmits it to the server B through the interface 15 and the Internet 16 (step S2, step T1).

In the server B, when the device information of the DVD recorder A is received (step N1), it transmits information of function which is selectable in the DVD recorder A side (selectable function information) in response to the reception (step N2, step T2). In the DVD recorder A, when the function information receiving portion of the system controller 10 receives the selectable function information which is transmitted from the server B (step S3), the selectable function list display processing portion of the system controller 10 makes the OSD portion 7 perform OSD process for data of the selectable function information and makes the display device 81 of the television receiver 8 perform a list display of the selectable function (step S4).

Then, the user operates the remote controller 13 to select the required function, in this case the reproducing function of MP3 from the display of list of the selectable function (step T3). By this selection, the selectable function information transmitting portion of the system controller 10 detects that the reproducing function of MP3 is selected from the selectable function which is displayed in the list display (step S5), and transmits information of the reproducing function of MP3 to the server B (step S6).

In the server B, when the information of the required function in this case the reproducing function of MP3 which is transmitted from the DVD recorder A is received (step N3), the server calculates amount billed to distribute the reproducing function for MP3 in order to distribute the reproducing function for MP3 to the user (step N4), transmits the amount billed and the like to the DVD recorder A and requests a password (step N5, step T4). By this request, when the billing information receiving portion of the system controller 10 in the DVD recorder A receives the billing information containing the amount billed and the password request that is transmitted from the server B (step S7), the billing information display processing portion of the system controller 10 makes the OSD portion 7 perform the OSD process of data of the billing information and makes the display device 81 display the billing information containing the amount billed and the password request (step S8).

Then, when the user sees and approves the amount billed which is displayed on the display device 81, the user inputs the password into the DVD recorder A by operation of the remote controller 13 and makes the DVD recorder A transmit the password (step T5). That is, when the amount billed that is contained in the billing information is approved and the password is input by operation of the remote controller 13 (step S9), and when a transmission direction to transmit the password to the server B is performed by operation of the remote controller 13 (step S10), the password transmitting portion of the system controller 10 transmits the password to the server B (step S11).

When the server B receives the password which is transmitted from the DVD recorder A (step N6), the server B judges if the password is correct or not (step N7). After the password is judged to be correct, the server B transmits the required firmware in this case the firmware related to reproducing function for MP3 to the DVD recorder A (step N8, step T6), and when the transmission is completed (step N9, step T8), this operation by the server B is terminated.

When the firmware related to the reproducing function for MP3 is transmitted from the server B, in the DVD recorder A the firmware receiving portion of the system controller 10 receives the firmware related to the reproducing function for MP3 which is transmitted from the server B (step S12, step T7), and after the reception of the firmware is completed (step S13, step T9), the firmware storage processing portion of the system controller 10 starts to rewrite the existing firmware which is stored in the flash memory 14 to the new firmware on which the firmware related to the reproducing function for MP3 is added (step S14, step T9), and when this rewriting is completed (step S15, step T10), this operation by the DVD recorder A is terminated. After these operations, the amount billed is paid later from the user to the manufacturer in a predetermined way to pay.

As above described, according to this embodiment, because the optional function is selectable in users side, and it becomes possible to select an optional function which is required by the user and to add the optional function, the user can get the function only for additional cost for the required optional function and need not to newly purchase an optical disc apparatus in which the required function is contained, as a result economic burden for the user to obtain the function can be reduced. Further for the manufacturer, because the optical function can be added later in response to the user's requirement, an optical disc apparatus which contains only a simple function and which gets wide range of target purchaser, can be manufactured in mass production, and it becomes no need to perform production for many numbers of models of the optical disc apparatus, as a result, cost reduction of the optical disc apparatus can be realized.

What is claimed is:

1. An optical disc apparatus comprising:
   a structure which can connect with a server through Internet; and
   a system controller that includes:
   a device information transmitting portion which transmits a device information to identify the apparatus to the server when the apparatus connects with the server through the Internet and obtains a firmware in that a function required by a user is contained from the server;
   a function information receiving portion which receives function information that is transmitted from the server in response to the device information received by the server and that is selectable in the apparatus side;
   a selected function information transmitting portion which transmits information of a selected function that is selected by the user from the selectable function to the server;
   a billing information receiving portion which receives billing information that contains amount billed and a password request transmitted from the server in response to the selected function information which is received by the server;
   a password transmitting portion which transmits a password to the server when the amount billed that is contained in the billing information is approved, the password is input by the user, and a transmission direction is performed to transmit the password to the server;
   a firmware receiving portion which receives a firmware that is transmitted from the server after the password received by the server is judged to be correct; and
   a firmware storage processing portion which rewrites an existing firmware that is stored in a flash memory to a firmware on which the received firmware is added after reception of the firmware is completed.

2. The optical disc apparatus according to claim 1, wherein the system controller further includes a selectable function list display processing portion which makes a display device display a list of the selectable function when the function information receiving portion receives the selectable function information.

3. The optical disc apparatus according to claim 1, wherein the system controller further includes a billing information display processing portion which makes a display device display the billing information that contains the amount billed and the password request when the billing information receiving portion receives the billing information.

4. The optical disc apparatus according to claim 2, wherein the system controller further includes a billing information display processing portion which makes the display device display the billing information that contains the amount billed and the password request when the billing information receiving portion receives the billing information.

* * * * *